United States Patent
Luo

(10) Patent No.: US 11,276,402 B2
(45) Date of Patent: Mar. 15, 2022

(54) METHOD FOR WAKING UP ROBOT AND ROBOT THEREOF

(71) Applicant: CLOUDMINDS (SHENZHEN) ROBOTICS SYSTEMS CO., LTD., Shenzhen (CN)

(72) Inventor: Lei Luo, Shenzhen (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 245 days.

(21) Appl. No.: 16/678,267

(22) Filed: Nov. 8, 2019

(65) Prior Publication Data

US 2020/0090653 A1    Mar. 19, 2020

Related U.S. Application Data

(63) Continuation of application No. PCT/CN2017/083424, filed on May 8, 2017.

(51) Int. Cl.
*G10L 15/22* (2006.01)
*B25J 9/16* (2006.01)
(Continued)

(52) U.S. Cl.
CPC ............ *G10L 15/22* (2013.01); *B25J 9/1697* (2013.01); *B25J 13/003* (2013.01); *G05B 19/4155* (2013.01); *G06F 3/013* (2013.01); *G06K 9/00664* (2013.01); *G10L 15/1822* (2013.01); *G10L 15/24* (2013.01); *G05B 2219/36017* (2013.01); *G06F 3/167* (2013.01); *G10L 15/25* (2013.01); *G10L 2015/088* (2013.01); *G10L 2015/223* (2013.01); *H04L 12/2803* (2013.01); *H04L 12/2821* (2013.01)

(58) Field of Classification Search
None
See application file for complete search history.

(56) References Cited

U.S. PATENT DOCUMENTS 6,721,706 B1 *   4/2004   Strubbe ................... G10L 15/22
                                                            704/275
7,680,667 B2 *   3/2010   Sonoura ................... G10L 15/26
                                                            704/270
(Continued)

FOREIGN PATENT DOCUMENTS

CN    1423228 A    6/2003
CN    1981257 A    6/2007
(Continued)

OTHER PUBLICATIONS

International Search Report dated Feb. 12, 2018; PCT/CN2017/083424.
(Continued)

*Primary Examiner* — Richard Z Zhu

(57) ABSTRACT

A method for waking up a robot includes: acquiring sight range information when a voice command issuer issues a voice command; if the sight range information of the voice command issuer when issuing the voice command is acquired, determining, based on the sight range information, whether the voice command issuer gazes the robot when the voice command is issued; and determining that the robot is called if the voice command issuer gazes the robot.

16 Claims, 9 Drawing Sheets

Acquire sight range information when a voice command issuer issues a voice command — 101

Determine, based on the sight range information, whether the voice command issuer gazes the robot when the voice command is issued if the sight range information of the voice command issuer when issuing the voice command is acquired, and determine that the robot is called if the voice command issuer gazes the robot — 102

(51) Int. Cl.
  *B25J 13/00*     (2006.01)
  *G05B 19/4155*   (2006.01)
  *G06F 3/01*      (2006.01)
  *G06K 9/00*      (2022.01)
  *G10L 15/18*     (2013.01)
  *G10L 15/24*     (2013.01)
  *G10L 15/08*     (2006.01)
  *G10L 15/25*     (2013.01)
  *H04L 12/28*     (2006.01)
  *G06F 3/16*      (2006.01)

(56)     References Cited

U.S. PATENT DOCUMENTS

| | | | | |
|---|---|---|---|---|
| 9,143,880 | B2* | 9/2015 | Vennstrom | H04S 7/307 |
| 9,652,035 | B2* | 5/2017 | Bedell, Jr | H04M 1/72412 |
| 9,953,647 | B2* | 4/2018 | Mun | G10L 15/32 |
| 10,317,992 | B2* | 6/2019 | Prokofieva | G06F 3/167 |
| 10,395,653 | B2* | 8/2019 | Ikeno | G10L 15/02 |
| 10,534,429 | B2* | 1/2020 | Liu | G06F 1/1698 |
| 10,635,386 | B2* | 4/2020 | Vennstrom | G06F 3/017 |
| 10,642,569 | B2* | 5/2020 | Lin | G06F 3/013 |
| 2002/0105575 | A1 | 8/2002 | Hinde et al. | |
| 2008/0289002 | A1* | 11/2008 | Portele | G06F 3/038 726/2 |
| 2013/0307771 | A1 | 11/2013 | Parker | |
| 2015/0088518 | A1* | 3/2015 | Kim | G10L 15/22 704/251 |
| 2015/0109191 | A1* | 4/2015 | Johnson | G06F 3/013 345/156 |
| 2016/0373269 | A1* | 12/2016 | Okubo | H04L 12/2825 |
| 2017/0262051 | A1* | 9/2017 | Tall | G06F 3/04842 |

FOREIGN PATENT DOCUMENTS

| | | |
|---|---|---|
| CN | 103119644 A | 5/2013 |
| CN | 105204628 A | 12/2015 |
| CN | 106203259 A | 12/2016 |
| CN | 106292732 A | 1/2017 |
| CN | 106448663 A | 2/2017 |
| JP | 2017010176 A | 1/2017 |
| JP | 2017072857 A | 4/2017 |
| KR | 20080019834 A | 3/2008 |

OTHER PUBLICATIONS

1st Office Action dated Nov. 11, 2020 by the JP Office; Appln.No. 2019-561852.
1st Office Action dated Jul. 20, 2020 by the CN Office; Appln.No. 201780000608.6.

* cited by examiner

METHOD FOR WAKING UP ROBOT AND ROBOT THEREOF

CROSS-REFERENCE TO RELATED APPLICATIONS

This application is a continuation of International Application No. PCT/CN2017/083424 with an international filing date of May 8, 2017, the entire contents of which are incorporated herein by reference.

TECHNICAL FIELD

Embodiments of the present application relate to the technical field of artificial intelligence-based automatic control, and in particular, relate to a method and apparatus for waking up a robot, and a robot thereof.

BACKGROUND

With the development of artificial intelligence, robots are bringing more and more convenience to people's life. At present, when a user desires to control a robot, the user may predefine a wake-up word for the robot. When the robot hears a specific wake-up word (for example, a name of the robot), the robot knows that the user is calling it. For example, the user may define a wake-up word Alexa or Mike for the robot, and when the user calls Alexa or Mike, the robot may know that the user is calling it.

During study of the related art, the inventors have found that the related art has at least the following problem: The user forgets the name of the robot at a moment, or the user possesses a plurality of robots and thus may fail to remember names of all these robots, or the user fails to correctly distinguishing the robots because some robots appear similar to each other. In the above cases, the user may fail to wake up the robot or wake up an undesired robot, and as a result, the actual needs of the user fail to be accommodated.

SUMMARY

An embodiment of the present application provides a method for waking up a robot, applied to a robot. The method includes: acquiring sight range information when a voice command issuer issues a voice command; if the sight range information of the voice command issuer when issuing the voice command is acquired, determining, based on the sight range information, whether the voice command issuer gazes the robot when the voice command is issued; and determining that the robot is called if the voice command issuer gazes the robot.

Another embodiment of the present application provides a robot. The robot includes: at least one processor; and a memory communicably connected to the at least one processor; wherein the memory stores instructions executable by the at least one processor, wherein, the instructions, when being executed by the at least one processor, cause the at least one processor to perform the steps of: acquiring sight range information when a voice command issuer issues a voice command; if the sight range information of the voice command issuer when issuing the voice command is acquired, determining, based on the sight range information, whether the voice command issuer gazes the robot when the voice command is issued; and determining that the robot is called if the voice command issuer gazes the robot.

Still another embodiment of the present application provides a non-volatile computer-readable storage medium. The computer-readable storage medium stores computer-executable instructions, which, when being executed by a robot, cause the robot to perform the steps of: acquiring sight range information when a voice command issuer issues a voice command; if the sight range information of the voice command issuer when issuing the voice command is acquired, determining, based on the sight range information, whether the voice command issuer gazes the robot when the voice command is issued; and determining that the robot is called if the voice command issuer gazes the robot.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions and advantages of the embodiments of the present application clearer, the technical solutions according to the embodiments of the present application are clearly and thoroughly described with reference to the accompanying drawings of the embodiments of the present application. The described embodiments are merely exemplary ones, but are not all the embodiments of the present application. Based on the embodiments of the present application, all other embodiments derived by persons of ordinary skill in the art without any creative efforts shall fall within the protection scope of the present application.

Figure 1:
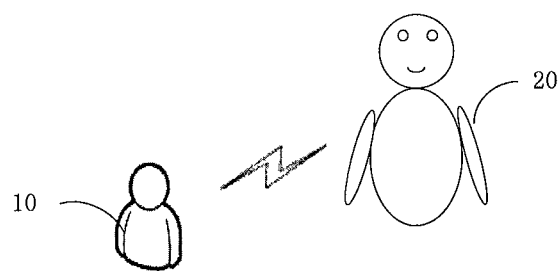
FIG. 1 is a schematic diagram of an application scenario of a method and an apparatus according to the present application.
Figure 2:
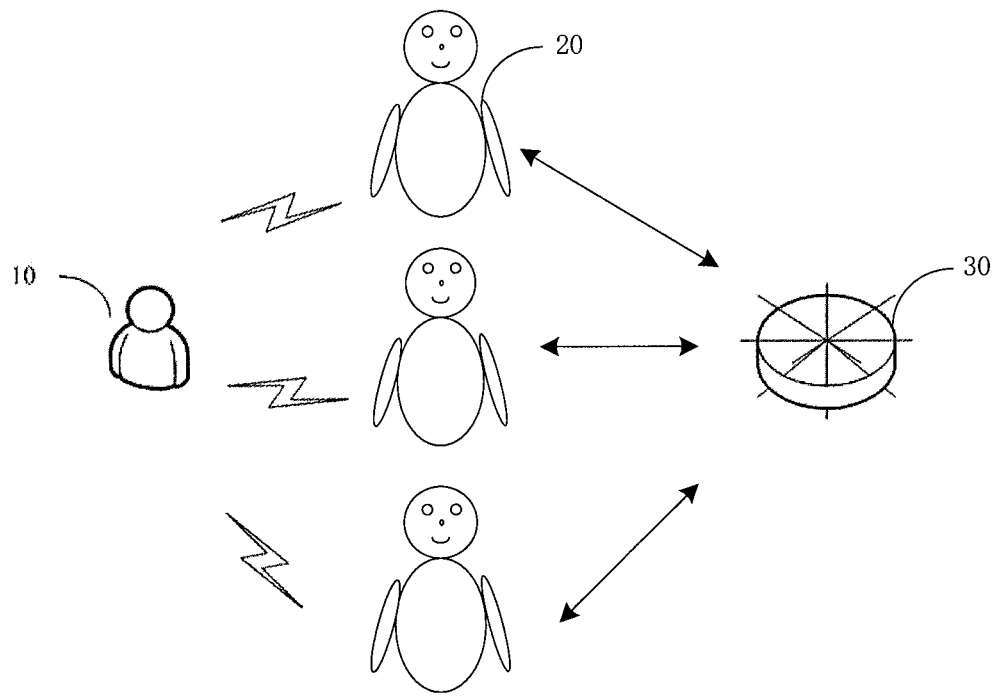
FIG. 2 is a schematic diagram of an application scenario of a method and an apparatus according to the present application.

A method and apparatus for waking up a robot according to the present application are applicable to application scenarios as illustrated in FIG. 1 and FIG. 2, wherein one or a plurality of robots 20 may be included. The plurality of robots 20 may communicate with each other over a network 30. The network 30 may be, for example, a local area network in a family or company, or a specific network or the like. The robot 20 includes at least one network interface to establish a communication connection to the network 30, such that data or instructions may be acquired from the network 30. A user 10 may be a group having the same or similar operation behaviors in any quantity, for example, a family, a work group or an individual. The user 10 may set the plurality of robots 20 or issue a command to the plurality of robots 20.

Each robot has a corresponding wake-up word for waking up the robot from a sleep state or responding to a call of the user. Therefore, the wake-up word may be predefined by the user. The wake-up keyword may be a name or an identification code of the robot, or any other word. In this way, a scenario of a specific wake-up word is defined for each robot, and the user needs to remember the specific wake-up word of each robot. In a scenario where the user forgets the specific wake-up word, the robot may not be woken up. If the specific wake-up words may be substituted by a generic pronoun, the user is free of the trouble of memorizing each specific wake-up word. With the method and apparatus for waking up a robot according to the present application, a universal pronoun may be employed to wake up the robot. It should be noted that the method and apparatus for waking up a robot according to the present application are applicable to a scenario where a universal pronoun is used as the wake-up word, and is likewise applicable to a scenario where a specific wake-up word is used. The universal pronoun may be a pronoun representative of a call, for example, "you", "you guys", "hi" or the like, and may also be a user-defined pronoun, for example, "dear" or "robot". Further, the universal pronoun may also be defined as a single form or a plural form. For example, "you" or "robot" represents a pronoun in the single form, and "you guys" or "robots" represents a pronoun in the plural form.

Figure 3:
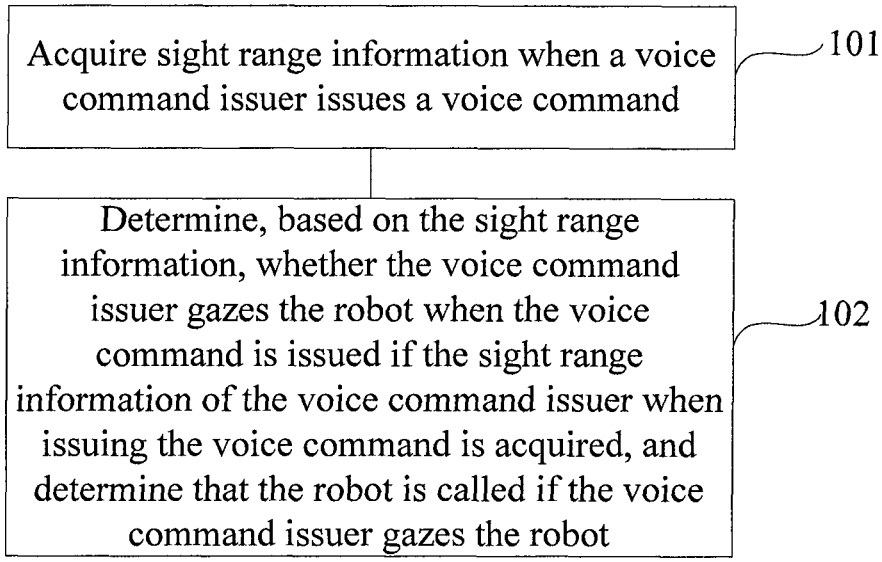
FIG. 3 is a flowchart of a method for waking up a robot according to an embodiment of the present application.

An embodiment of the present application provides a method for waking up a robot, which may be performed by any robot as illustrated in FIG. 1 or FIG. 2. As illustrated in FIG. 3, a flowchart of a method for waking up a robot according to an embodiment is given. The method includes the following steps:

Step 101: Sight range information when a voice command issuer issues a voice command is acquired.

Step 102: Whether the voice command issuer gazes the robot when the voice command is issued is determined based on the sight range information if the sight range information of the voice command issuer when issuing the voice command is acquired, and it is determined that the robot is called if the voice command issuer gazes the robot.

When a person is speaking, he or she is usually gazing the one that is listening. Therefore, even if a user does not employ a specific wake-up word but uses a universal pronoun as a wake-up word, if which robot or robots the user gazes when the user issuing a voice command may be determined, it may be determined to which robot or robots the user is issuing the voice command. For example, the user gazes two robots and issues a voice command "you, please tidy up my room", and if these two robots may determine that the user gazes them when the user issues the voice command, the robots may determine that they are called and respond to the user.

Generally, the robot is equipped with a camera or a 360-degree panorama camera. The camera may record images around the robot and store the images to a visual information cache. By calling the images in the visual information cache, a position of the user may be identified, and whether the user faces the robot may be determined, such that it is determined whether the user gazes the robot.

With the method and apparatus for waking up a robot according to the embodiments of the present application, the robot determines, based on the sight range information when the voice command issuer issues a voice command, whether the voice command issuer gazes the robot, and determines that the robot is called if the voice command issue gazes the robot. In a scenario where the user forgets the name of the robot, the user may wake up the robot only if the user faces the robot and issues the voice command using the pronoun as the wake-up word, with no need to memorize the name of each robot. In this way, user experience is enhanced.

Figure 4:
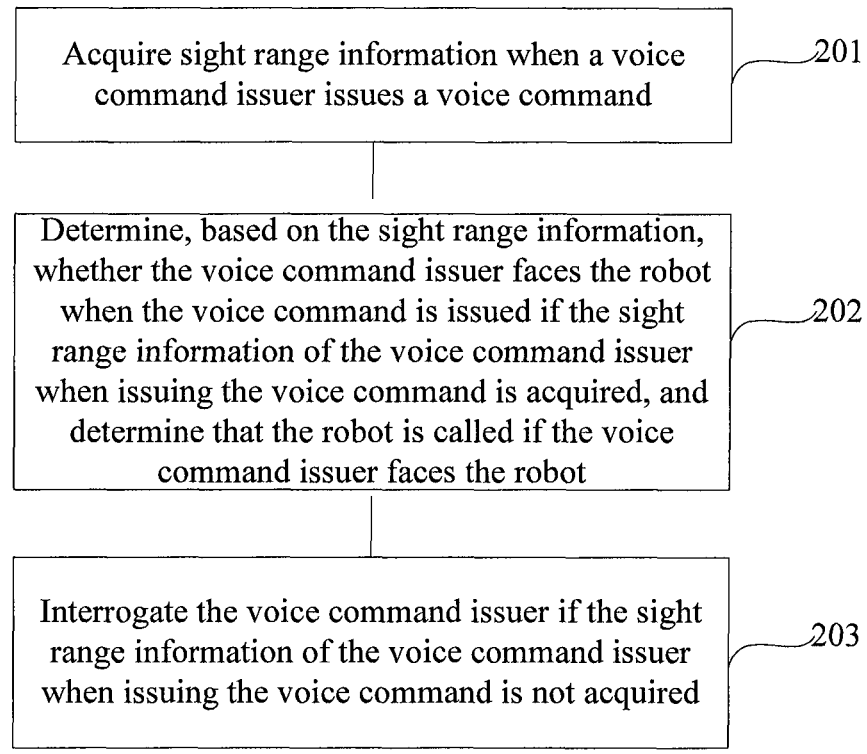
FIG. 4 is a flowchart of a method for waking up a robot according to an embodiment of the present application.

As illustrated in FIG. 4, a schematic flowchart of another embodiment of the method is given. In this embodiment, the method includes the following steps:

Step 201: Sight range information when a voice command issuer issues a voice command is acquired.

Step 202: Whether the voice command issuer faces the robot when the voice command is issued is determined based on the sight range information if the sight range information of the voice command issuer when issuing the voice command is acquired, and it is determined that the robot is called if the voice command issuer faces the robot.

Step 203: The voice command issuer is interrogated if the sight range information of the voice command issuer when issuing the voice command is not acquired.

Sometimes when the user needs help from the robot, it is probable that the robot is doing something at a remote place. With the method according to this embodiment, the user does not need to walk to the robot to issue the voice command to the robot, but may issue the voice command at his or her place. Although the robot hearing the voice command determines that the voice command issuer, that is, the user, does not gaze the robot when issuing the voice command, the robot may proactively interrogate the user to determine whether the user calls the robot. According to the embodiment of the present application, when calling a remote or a busy robot using a universal pronoun, the user may call the robot at his or her place, such that user experience is further enhanced.

Specifically, in some embodiments of the method, the acquiring sight range information when a voice command issuer issues a voice command includes:

acquiring time information of the voice command and information of the voice command issuer;

acquiring visual information and position information of the robot complying with the time information, and acquiring, based on the visual information and the position information of the robot, the sight range information of the voice command issuer.

In this embodiment, the acquiring sight range information when a voice command issuer issues a voice command in step 102 or step 202 refers to that the robot acquires the sight range information of the voice command issuer.

Optionally, for further improvement of accuracy of user calling, all the robots hearing the same voice command are placed in a candidate group. A robot in the candidate group may broadcast its acquired sight range information to other robots when the user issues the voice command, such that all the robots in the candidate group may share the sight range information acquired by the other robots in the candidate group. As such, even if some robots fail to capture the sight range of the user or the captured sight range is incomplete, the sight range of the user may also be acquired from other robots, such that the robot determines whether the user gazes the robot. In this embodiment, the acquiring sight range information when a voice command issuer issues a voice command in step 102 or step 202 refers to that the robot acquires the sight range information of the voice command issuer or the robot receives the sight range information broadcast by the other robots.

Figure 5:
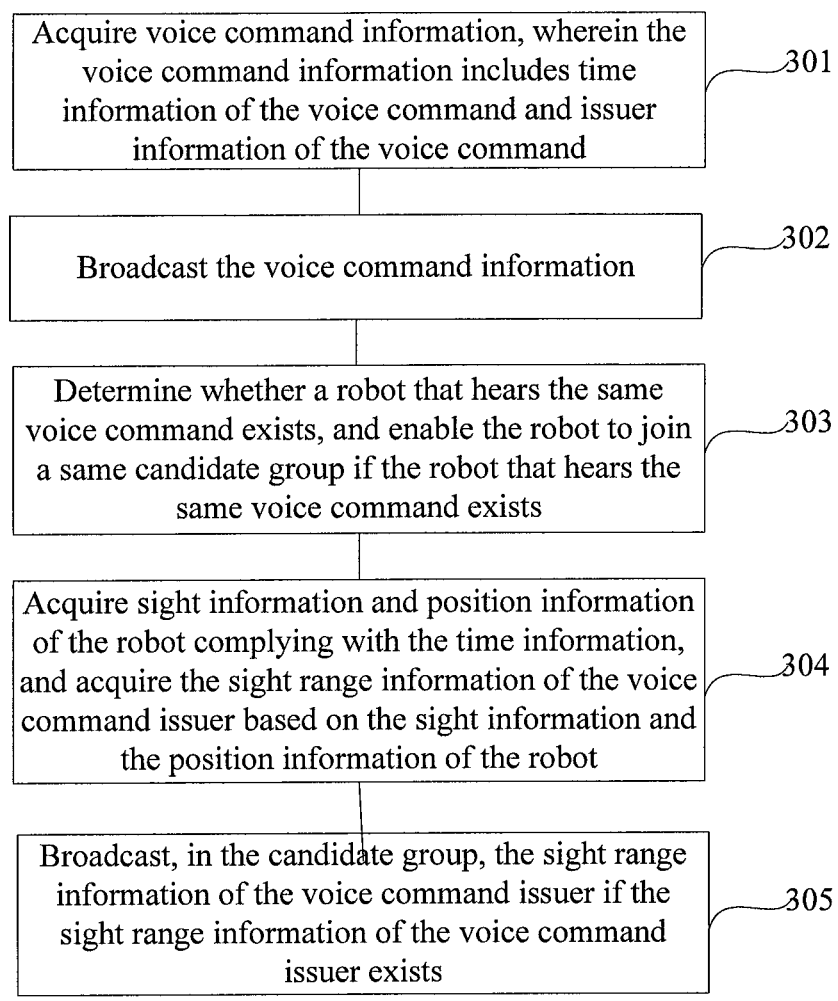
FIG. 5 is a flowchart of a step of acquiring sight range information of a voice command issuer when issuing a voice command in the method for waking up a robot according to an embodiment of the present application.

In this embodiment, as illustrated in FIG. 5, the sight range information when a voice command issuer issues a voice command specifically includes the following steps:

Step 301: Voice command information is acquired, wherein the voice command information includes time information of the voice command and information of the voice command issuer.

In practice, a microphone may be arranged on the robot to receive a voice signal in real time. The voice command may be the voice signal received in real time. However, sometimes, although the user sends a voice, the voice is not the voice command sent to the robot. Therefore, the voice signal needs to be further judged. The voice signal is recorded only when the voice signal is the voice command issued by the user. In some scenarios, when the user is far away from the robot, even if the robot is capable of receiving a voice signal from a long distance, if a sound pressure level of the voice signal is too small, the voice signal may still not be correctly parsed. Therefore, the voice signal whose sound pressure level is less than a specific value is not recorded.

Specifically, the acquiring voice command information includes:

monitoring a voice signal;

parsing out a wake-up word in the voice signal;

determining a sound pressure level of the voice signal;

if the wake-up word indicates a call and the sound pressure level of the voice signal exceeds a predetermined threshold, recording a start time point and an end time point of the voice signal as the time information of the voice command, and recording the sound pressure level of the voice signal as the sound pressure level of the voice command; and identifying a voice signal issuer based on the voice signal, and recording the voice signal issuer as the information of the voice command issuer.

Whether the wake-up word indicates a call may be judged by determining whether a time interval between the wake-up word and following voice content exceeds a predetermined time period. If the time interval exceeds the predetermined time period, the wake-up word indicates a call. Alternatively, whether other voice content exists prior to the first wake-up word is judged. If no other voice content exists, the wake-up word indicates a call.

In other embodiments, the time information of the voice command may also be a start time point and an end time point of the wake-up word in the voice command, which may be specifically selected based on speaking habits of the user.

Each person has a unique voiceprint feature, and identity of a voice signal sender may be identified by identifying the voiceprint feature. The voiceprint feature of the user may be pre-stored in the robot. In a scenario where one robot is owned by a plurality of users, a corresponding relationship between the voiceprint features and information of the owners. In this way, it is convenient for the robot to identify a specific owner based on the voiceprint feature.

Step 302: The voice command information is broadcast.

Step 303: Whether a robot that hears the same voice command exists is determined, and the robot is enabled to join a same candidate group if the robot that hears the same voice command exists.

Specifically, in practice, the time information and the information of the voice command issuer may be broadcast by the robots to the candidate group, and then a robot determines which robots hears the same voice command, establishes the candidate group and instructs these robots to join the candidate group.

If the robot with matched time information and information of the voice command issuer, it is determined that the robot hears the same voice command. That is, if the voice commands are sent at the same time by the same issuer, the voice commands are the same voice command.

Step 304: Visual information and position information of the robot complying with the time information are acquired, and the sight range information of the voice command issuer is acquired based on the visual information and the position information of the robot.

In practice, in a scenario where the time information of the voice command is a start time point and an end time point of the voice command, the robot may call visual information between the start time point and the end time point of the voice command from the visual information cache thereof (the visual information cache may cache history visual inputs within a specific time period, for example, within 5s away from the current time). In a scenario where the time information of the voice command is the start time point and the end time point of the wake-up word, the robot may call visual information between the start time point and the end time point of the wake-up word from the visual information cache thereof. Apparently, by selecting the start time point and the end time point of the wake-up word, the data processing amount is relatively small, and the running speed is relatively high.

In practice, facial features, voiceprint features and a corresponding relationship between the facial feature and voiceprint features and the identity of the user may be pre-stored in the robot. The robot may determine the voice command issuer in combination with the facial features of the user. The time information of the voice command issuer may be divided into a plurality of time points. At each time point, an angle between the face of the voice command issuer and the robot may be determined based on the visual information at this time point, and a sight direction at this time point may be determined based on the position information of the robot at this time point and the angle. The sight direction is a linear equation where the sight of the user faces towards a target direction. When the user calls a plurality of robots, a plurality of sight directions may be generated, and thus a plurality of linear equations are present. The acquired sight direction and a time point corresponding to the sight direction are used as the sight range information. The sight range information may be a sight direction and a time point corresponding thereto, or may be a plurality of sight directions and time points corresponding thereto. The time information is averagely divided into a plurality of time points.

In this case, a plurality of uniform time points between the start time point and the end time point are acquired, and a time stamp which is inherited in the system may also be directly used.

Optionally, in other embodiments of the method, a sight interval and a time range corresponding to the sight interval may be acquired based on the acquired sight direction and the time point corresponding to the sight direction, and the sight interval and the time range are used as the sight range information. The sight interval may be determined based on a sight start direction and a sight end direction. In a scenario where only one sight direction is defined, the sight interval is this single sight direction.

Step 305: The sight range information of the voice command issuer is broadcast in the candidate group if the sight range information of the voice command issuer exists.

It should be noted that steps 301 to 305 are not necessarily performed by each robot. Generally, the robot hearing the voice information may perform steps 301 and 302, and the robots in the candidate group may all perform steps 304 and 305. However, step 303 may be only performed by one robot or a plurality of robots. For example, each robot may broadcast its own operating state to the other robots, and an idlest robot performs step 303 and then shares a result to the other robots over the network.

Optionally, in some embodiments where the sight range information is the sight direction and the time point corresponding to the sight direction, the determining, based on the sight range information, whether the voice command issuer gazes the robot when the voice command is issued includes:

acquiring the position information of the robot within a predetermined time period; and in practice, the position information of the robot is generally stored in a position information buffer (the position information cache may cache history position information within a specific time period, for example, within 5s away from the current time), and the robot may call the position information within 5s or 3s away from the current time; and determining whether the position information of the robot complying with the sight direction at a time point of the sight range information exists, determining that the voice command issuer gazes the robot if the position information of the robot complying with the sight direction at a time point of the sight range information exists, and otherwise, determining that the voice command issuer does not gaze the robot.

That is, whether the position of the robot is on the corresponding linear equation is determined at each time point in the sight range information. For prevention of errors in judging the sight direction by face identification, during judging whether the position of the robot satisfies the sight direction, a specific angle range may be reserved, for example, a range of 2 degrees to the left to 2 degrees to the right about a central axial line which is the linear equation where the position is on.

Optionally, in some embodiments where the sight range information is the sight interval and the time range corresponding to the sight interval, the determining, based on the sight range information, whether the voice command issuer gazes the robot when the voice command is issued includes:

acquiring the position information of the robot within a predetermined time period; and determining whether the position information of the robot complying with the sight direction at a time interval of the sight range information exists, determining that the voice command issuer gazes the robot if the position information of the robot complying with the sight direction at a time range of the sight range information exists, and otherwise, determining that the voice command issuer does not gaze the robot.

That is, whether the position of the robot coincides with the sight interval in the time range in the sight range information is determined, and if the position of the robot coincides with the sight interval, it indicates that the voice command issuer gazes the robot when issuing the voice command, and it may be determined that the robot is called.

Optionally, in some embodiments of the method, if the robot determines that the voice command issuer calls the robot, the robot may make a response to the voice command issuer. For example, the robot may turn its head to the voice command issuer after determining the voice direction by a microphone array, and voice interrogate a next instruction from the voice command issue. If the robot determines that the voice command issuer does not call the robot, the robot automatically exits from the candidate group. When the robot exits the candidate group, no other robot exists in the candidate group, the candidate group is canceled when the robot exits the candidate group.

Specifically, in some embodiments of the method, the interrogating the voice command issuer includes the following steps:

Step 401: Whether the wake-up word is a pronoun indicating a single form is determined.

The pronoun in the single form, for example, "you", is not a pronoun representing the single form, for example, "you", "hi" or the like.

Step 402: A robot hearing a voice command with a highest sound pressure level in the candidate group is determined if the wake-up word is the pronoun indicating the single form, such that the robot with the highest sound pressure level interrogates whether the voice command issuer calls the robot with the highest sound pressure level.

The robot with the highest sound pressure level may be a robot closest to the user, or an object to which the user issues the voice command. During interrogating the user, the robot may turn its head to the user in accordance with the voice direction captured by the microphone array of the robot.

Step 403: The voice command issuer is responded if the voice command issuer calls the robot.

If the voice command issuer calls the robot, the robot may further interrogate a user instruction or execute a user instruction. The robot may further broadcast a message to the candidate group, such that the other robots in the candidate group exit the candidate group, and then the robot may cancel the candidate group.

Step 404: If the voice command issuer does not call the robot, in a scenario where the voice command issuer issues a new voice command, sight range information of the voice command issuer when issuing the new voice command is acquired.

If the voice command issuer does not call the robot, the robot may acquire sight range when the voice command issuer issues a new voice command during the dialog with the voice command issuer. For example, the user may say: "I'm not calling you, I'm calling him.", and gazes another robot.

Step 405: Robots hearing voice commands with a highest sound pressure level and a second highest sound pressure level in the candidate group are determined if the wake-up word is not the pronoun indicating the single form, such that the robots with the highest sound pressure level and the second highest sound pressure level interrogate whether the voice command issuer calls only the robots with the highest sound pressure level and the second highest sound pressure level.

Step 406: The voice command issuer is responded if the voice command issuer calls only the robots with the highest sound pressure level and the second highest sound pressure level.

The voice command issuer may be responded by further interrogating a user instruction or executing a user instruction. The robot may further broadcast a message to the candidate group, such that the other robots in the candidate group exit the candidate group, and then the robot may cancel the candidate group.

Step 407: Otherwise, in a scenario where the voice command issuer issues a new voice command, sight range information of the voice command issuer when issuing the new voice command is acquired.

Step 408: The sight range information of the voice command issuer when issuing the new voice command is broadcast in the candidate group.

In the above embodiment, the method further includes:

determining, based on the sight range information, whether the voice command issuer gazes the robot when the voice command is issued if the sight range information of the voice command issuer when issuing the new voice command is acquired, and determining that the robot is called and responding to the voice command issuer if the voice command issuer gazes the robot.

The specific methods for acquiring the sight range information of the voice command issuer when issuing the voice command, and for determining, based on the sight range information, whether the voice command issuer gazes the robot when the voice command is issued may be referred to the above description, which is not described herein any further.

It should be noted that steps 401 to 408 are not necessarily performed by each robot. The determining whether the wake-up word is a pronoun in a single form in step 401, the determining the robot hearing the voice command with the highest sound pressure level of the voice command in the candidate group in step 402, and the determining the robots hearing the voice command with the highest sound pressure level and the second highest sound pressure level in the candidate group in step 405 may be each performed by one robot or a plurality of robots. For example, each robot may broadcast its own operating state to other robots in the candidate group, and an idlest robot performs the steps and then shares a result to other robots over the network. The interrogating the voice command issuer in step 402, and step 403 and step 4 are performed by the robot with the highest sound pressure level; the interrogating the voice command issuer in step 405, and step 406 and step 407 are performed by the robots with the highest sound pressure level and the second highest sound pressure level; and step 408 is performed by the robots with the highest sound pressure level and the second highest sound pressure level.

Figure 7:
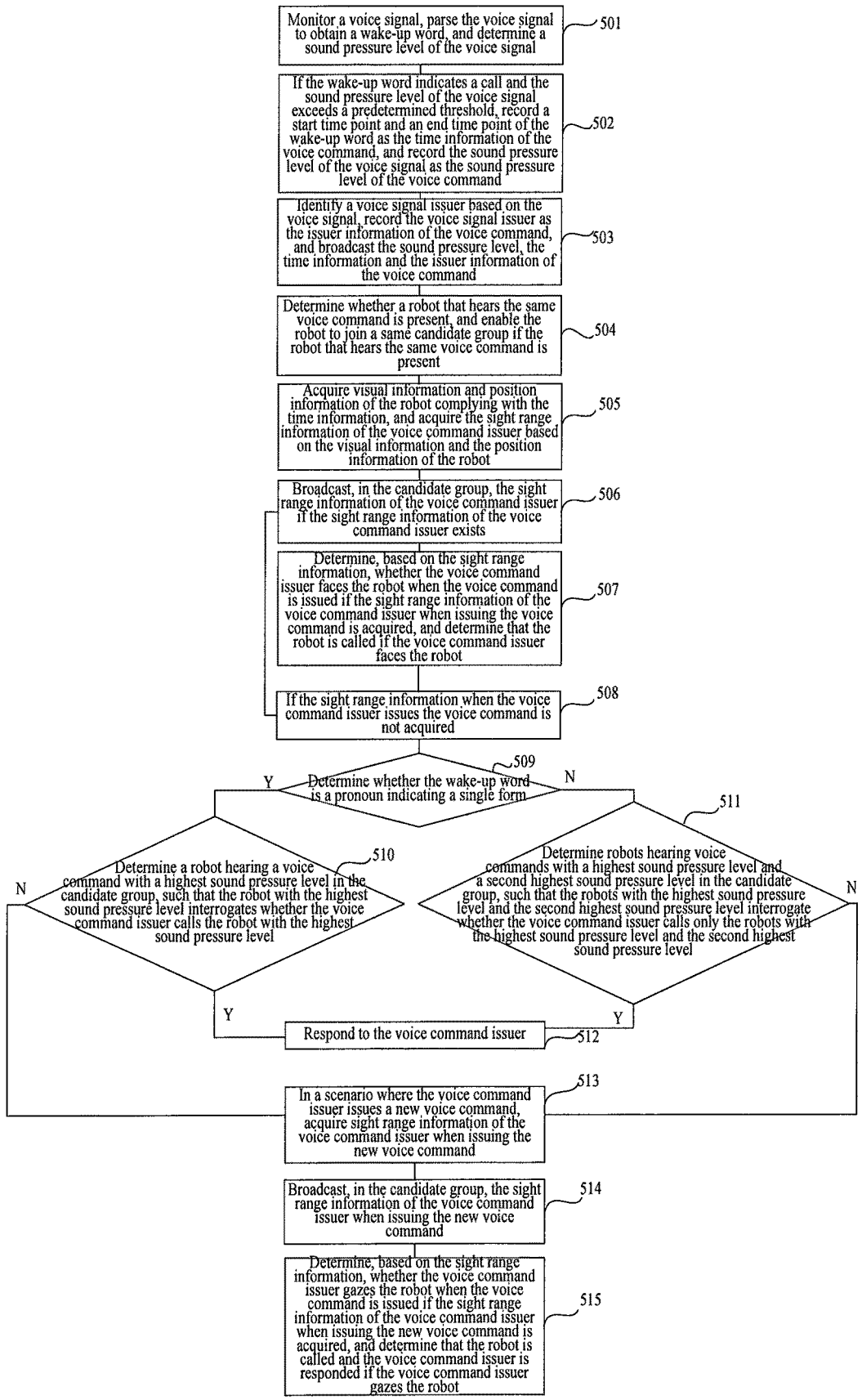
FIG. 7 is a flowchart of a method for waking up a robot according to an embodiment of the present application.

As illustrated in FIG. 7, a schematic flowchart of an embodiment of the method is given. In this embodiment, the method includes the following steps:

Step 501: A voice signal is monitored, the voice signal is parsed to obtain a wake-up word, and a sound pressure level of the voice signal is determined.

Step 502: If the wake-up word indicates a call and the sound pressure level of the voice signal exceeds a predetermined threshold, a start time point and an end time point of the wake-up word are recorded as the time information of the voice command, and the sound pressure level of the voice signal is recorded as the sound pressure level of the voice command.

Step 503: A voice signal issuer is identified based on the voice signal, the voice signal issuer is recorded as the information of the voice command issuer, and the sound pressure level, the time information and the information of the voice command issuer are broadcast.

Step 504: Whether a robot that hears the same voice command is present is determined, and the robot is enabled to join a same candidate group if the robot that hears the same voice command is present.

Step 505: Visual information and position information of the robot complying with the time information are acquired, and the sight range information of the voice command issuer is acquired based on the visual information and the position information of the robot.

Step 506: The sight range information of the voice command issuer is broadcast in the candidate group if the sight range information of the voice command issuer exists.

Step 507: Whether the voice command issuer faces the robot when the voice command is issued is determined based on the sight range information if the sight range information of the voice command issuer when issuing the voice command is acquired, and it is determined that the robot is called if the voice command issuer faces the robot.

The sight range information may be sight range information acquired by the robot itself, or may be sight range information received by the robot when the other robots broadcast the sight range information.

Step 508: If the sight range information when the voice command issuer issues the voice command is not acquired, step 509 is performed.

Step 509: Whether the wake-up word is a pronoun indicating a single form is determined.

Step 510: A robot hearing a voice command with a highest sound pressure level in the candidate group is determined if the wake-up word is the pronoun indicating the single form, such that the robot with the highest sound pressure level interrogates whether the voice command issuer calls the robot with the highest sound pressure level; if the voice command issuer calls the robot, step 512 is performed; and otherwise, step 513 is performed.

Step 511: Robots hearing voice commands with a highest sound pressure level and a second highest sound pressure level in the candidate group are determined if the wake-up word is not the pronoun indicating the singular form, such that the robots with the highest sound pressure level and the second highest sound pressure level interrogate whether the voice command issuer calls only the robots with the highest sound pressure level and the second highest sound pressure level; if the voice command issuer calls the robots with the highest sound pressure level and the second highest sound pressure level, step 512 is performed; and otherwise, step 513 is performed.

Step 512: The voice command issuer is responded.

Step 513: In a scenario where the voice command issuer issues a new voice command, sight range information of the voice command issuer when issuing the new voice command is acquired.

Step 514: The sight range information of the voice command issuer when issuing the new voice command is broadcast in the candidate group.

Step 515: Whether the voice command issuer gazes the robot when the voice command is issued is determined based on the sight range information if the sight range information of the voice command issuer when issuing the new voice command is acquired, and it is determined that the robot is called and the voice command issuer is responded if the voice command issuer gazes the robot.

Figure 8:
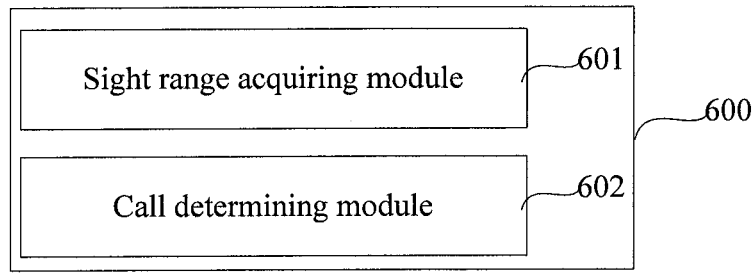
FIG. 8 is a schematic structural diagram of an apparatus according to an embodiment of the present application.

Correspondingly, an embodiment of the present application provides an apparatus for waking up a robot. The apparatus is arranged in any robot as illustrated in FIG. 1 or FIG. 2. As illustrated in FIG. 8, the apparatus 600 includes:

a sight range acquiring module 601, configured to acquire sight range information when a voice command issuer issues a voice command; and a call determining module 602, configured to determine, based on the sight range information, whether the voice command issuer gazes the robot when the voice command is issued if the sight range information of the voice command issuer issuing the voice command is acquired, and determine that the robot is called if the voice command issuer gazes the robot.

With the method and apparatus for waking up a robot according to the embodiments of the present application, the robot determines, based on the sight range information when the voice command issuer issues a voice command, whether the voice command issuer is gazing the robot, and determines that the robot is called if the voice command issue is gazing the robot. In a scenario where the user forgets the name of the robot, the user may wake up the robot only if the user is facing the robot and issues the voice command using the pronoun as the wake-up word, with no need to memorize the name of each robot. In this way, user experience is enhanced.

Figure 9:
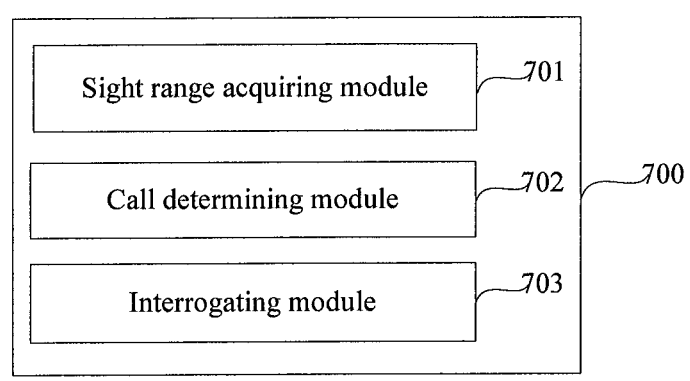
FIG. 9 is a schematic structural diagram of an apparatus according to an embodiment of the present application.

As illustrated in FIG. 9, a schematic structural diagram of another embodiment of the apparatus is given. In this embodiment, the apparatus 700 includes:

a sight range acquiring module 701, a call determining module 702 and an interrogating module 703; wherein the interrogating module 703 is configured to interrogate the voice command issuer if the sight range information of the voice command issuer when issuing the voice command is not acquired.

Figure 10:
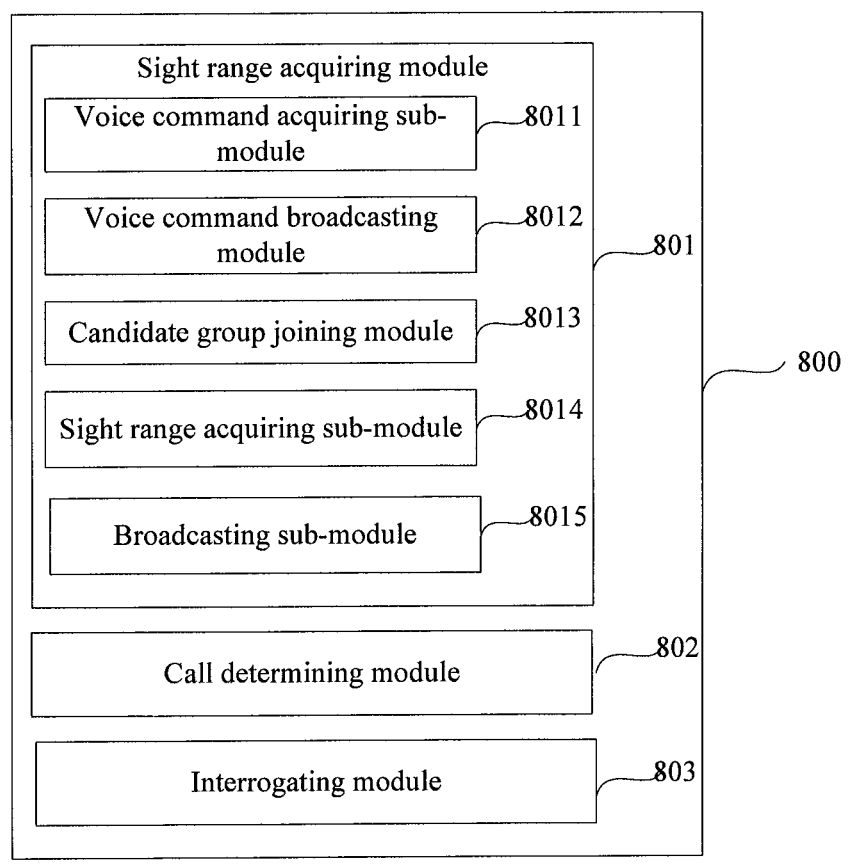
FIG. 10 is a schematic structural diagram of an apparatus according to an embodiment of the present application.

As illustrated in FIG. 10, in another embodiment of the apparatus, the sight range acquiring sub-module 801 includes:

a voice command acquiring sub-module 8011, configured to acquire voice command information, the voice command information including time information of the voice command and information of the voice command issuer;

a voice command broadcasting module 8012, configured to broadcast the voice command information;

a candidate group joining sub-module 8013, configured to determine whether a robot that hears the same voice command exists, and enable the robot to join a same candidate group if the robot that hears the same voice command exists;

a sight range acquiring sub-module 8014, configured to acquire visual information and position information of the robot complying with the time information, and acquire, based on the visual information and the position information of the robot, the sight range information of the voice command issuer when issuing the voice command; and a broadcasting sub-module 8015, configured to broadcast, in the candidate group, the visual sight range information of the voice command issuer.

In some embodiments of the apparatus, the voice command information further includes a sound pressure level of the voice command, and a voice command acquiring sub-module 900 includes:

a voice monitoring sub-unit 901, configured to monitor a voice signal;

a wake-up word parsing sub-unit 902, configured to parse out a wake-up word in the voice signal;

a sound pressure level determining sub-unit 903, configured to determine a sound pressure level of the voice signal;

a first voice command recording sub-unit 904, configured to, if the wake-up word indicates a call and the sound pressure level of the voice signal exceeds a predetermined threshold, record a start time point and an end time point of the voice signal as the time information of the voice command, and record the sound pressure level of the voice signal as the sound pressure level of the voice command; and a second voice command recording sub-unit 905, configured to identify a voice signal issuer based on the voice signal, and record the voice signal issuer as the information of the voice command issuer.

In some embodiments of the apparatus, the voice command information further includes a sound pressure level of the voice command, and the voice command acquiring sub-module includes:

a voice monitoring sub-unit, configured to monitor a voice signal;

a wake-up word parsing sub-unit, configured to parse out a wake-up word in the voice signal;

a sound pressure level determining sub-unit, configured to determine a sound pressure level of the voice signal;

a third voice command recording sub-unit, configured to, if the wake-up word indicates a call and the sound pressure level of the voice signal exceeds a predetermined threshold, record a start time point and an end time point of the wake-up word as the time information of the voice command, and record the sound pressure level of the voice signal as the sound pressure level of the voice command; and a second voice command recording sub-unit, configured to identify a voice signal issuer based on the voice signal, and record the voice signal issuer as the information of the voice command issuer.

Specifically, in some embodiments of the apparatus, the interrogating module 1000 includes:

a wake-up word determining sub-module 1001, configured to determine whether the wake-up word is a pronoun indicating a single form;

a first interrogating sub-module 1002, configured to determine a robot hearing a voice command with a highest sound pressure level in the candidate group if the wake-up word is the pronoun indicating the single form, such that the robot with the highest sound pressure level interrogates whether the voice command issuer calls the robot with the highest sound pressure level;

a first responding sub-module 1003, configured to respond to the voice command issuer if the voice command user calls the robot;

a first new sight range acquiring sub-module 1004, configured to, if the voice command issuer does not call the robot, in a scenario where the voice command issuer issues a new voice command, acquire sight range information of the voice command issuer when issuing the new voice command;

a second interrogating sub-module 1055, configured to determine robots hearing voice commands with a highest sound pressure level and a second highest sound pressure level in the candidate group if the wake-up word is not the pronoun indicating the single form, such that the robots with the highest sound pressure level and the second highest sound pressure level interrogate whether the voice command issuer calls only the robots with the highest sound pressure level and the second highest sound pressure level;

a second responding sub-module 1006, configured to respond to the voice command issuer if the voice command issuer is calling only the robots with the highest sound pressure level and the second highest sound pressure level;

a second new sight range acquiring sub-module 1007, configured to, if the voice command issuer is not calling the robots with the highest sound pressure level and the second highest sound pressure level, in a scenario where the voice command issuer issues a new voice command, acquire sight range information of the voice command issuer when issuing the new voice command; and a new sight range broadcasting sub-module 1008, configured to broadcast, in the candidate group, the sight range information of the voice command issuer when issuing the new voice command.

The apparatus further include:

a call re-determining module, configured to determine, based on the sight range information, whether the voice command issuer gazes the robot when the voice command is issued if the sight range information of the voice command issuer when issuing the new voice command is acquired, and determine that the robot is called and respond to the voice command issuer if the voice command issuer gazes the robot.

In some embodiments of the apparatus, the sight range acquiring sub-module 1100 includes:

a time dividing sub-unit 1101, configured to equally divide the time information of the voice command into a plurality of time points;

a sight direction determining sub-unit 1102, configured to, at each time point, determine an angle between the face of the voice command issuer and the robot based on the visual information at the time point, and acquire a sight direction at the time point based on the position information of the robot at the time point and the angle; and a sight range acquiring sub-unit 1103, configured to use the acquired sight direction and a time point corresponding to the sight direction as the sight range information.

Optionally, in some embodiments of the apparatus, the sight range acquiring sub-module includes:

a time dividing sub-unit, configured to equally divide the time information of the voice command into a plurality of time points;

a sight direction determining sub-unit, configured to, at each time point, determine an angle between the face of the voice command issuer and the robot based on the visual information at the time point, and acquire a sight direction at the time point based on the position information of the robot at the time point and the angle; and a second sight range acquiring sub-unit, configured to acquire a sight interval and a time range corresponding to the sight interval based on the acquired sight direction and the time point corresponding to the sight direction, and use the sight interval and the time range as the sight range information.

Optionally, in some embodiments of the apparatus, the call determining module 1200 includes:

a position acquiring sub-module 1201, configured to acquire the position information of the robot within a predetermined time period; and a first gaze determining sub-module 1202, configured to determine whether the position information of the robot complying with the sight direction at a time point of the sight range information exists, and determine that the voice command issuer gazes the robot if the position information of the robot complying with the sight direction at a time point of the sight range information exists.

Optionally, in some embodiments of the apparatus, the call determining module includes:

a position acquiring sub-module, configured to acquire the position information of the robot within a predetermined time period; and a second gaze determining sub-module, configured to determine whether the position information of the robot at the time range of the sight range information complies with the sight interval, and determining that the voice command issuer gazes the robot if the position information of the robot at the time range of the sight range information complies with the sight interval.

It should be noted that the above apparatus for waking up a robot may perform the method for waking up a robot according to the embodiments of the present application, has corresponding function modules for performing the method, and achieves the corresponding beneficial effects. For technical details that are not illustrated in detail in the embodiments of the apparatus for waking up a robot, reference may be made to the description of the method for waking up a robot according to the embodiments of the present application.

Figure 15:
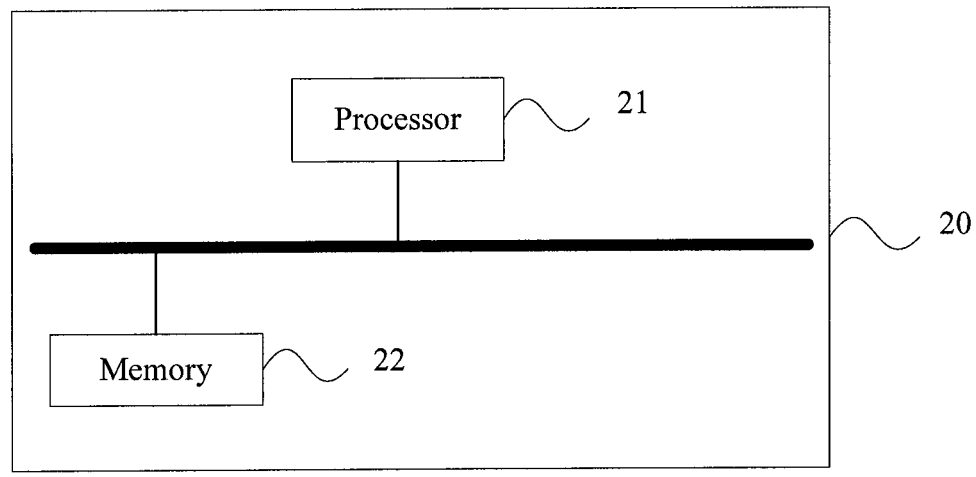
FIG. 15 is a schematic hardware structural diagram of a robot in the method for waking up a robot according to an embodiment of the present application.

FIG. 15 is a schematic hardware structural diagram of a robot 20 in the method for waking up a robot according to an embodiment of the present application.

As illustrated in FIG. 15, the robot 20 includes: at least one processor 21 and a memory 22, and FIG. 5 uses one processor as an example.

The at least one processor 21 and the memory 22 may be connected via a bus or in another manner, and FIG. 15 uses the bus as an example.

The memory 22, as a non-volatile computer readable storage medium, may be configured to store non-volatile software programs, non-volatile computer executable programs and modules, for example, the program instructions/modules corresponding to the methods for waking up a robot in the embodiments of the present application (for example, the call determining module 601 as illustrated in FIG. 8). The non-volatile software programs, instructions and modules stored in the memory 22, when being executed, cause the processor 21 to perform various function applications and data processing of a server, that is, performing the methods for waking up a robot according to the above method embodiments.

The memory 22 may include a program memory area and data memory area, wherein the program memory area may store operation systems and application programs needed by at least function; and the data memory area may store data created according to the usage of the apparatuses for waking up a robot. In addition, the memory 22 may include a high speed random access memory, or include a non-volatile memory, for example, at least one disk storage device, a flash memory device, or another non-volatile solid storage device. In some embodiments, the memory 22 optionally includes memories remotely configured relative to the processor 21. These memories may be connected to the apparatus for waking up a robot over a network. Examples of the above network include, but not limited to, the Internet, Intranet, local area network, mobile communication network and a combination thereof.

Figure 6:
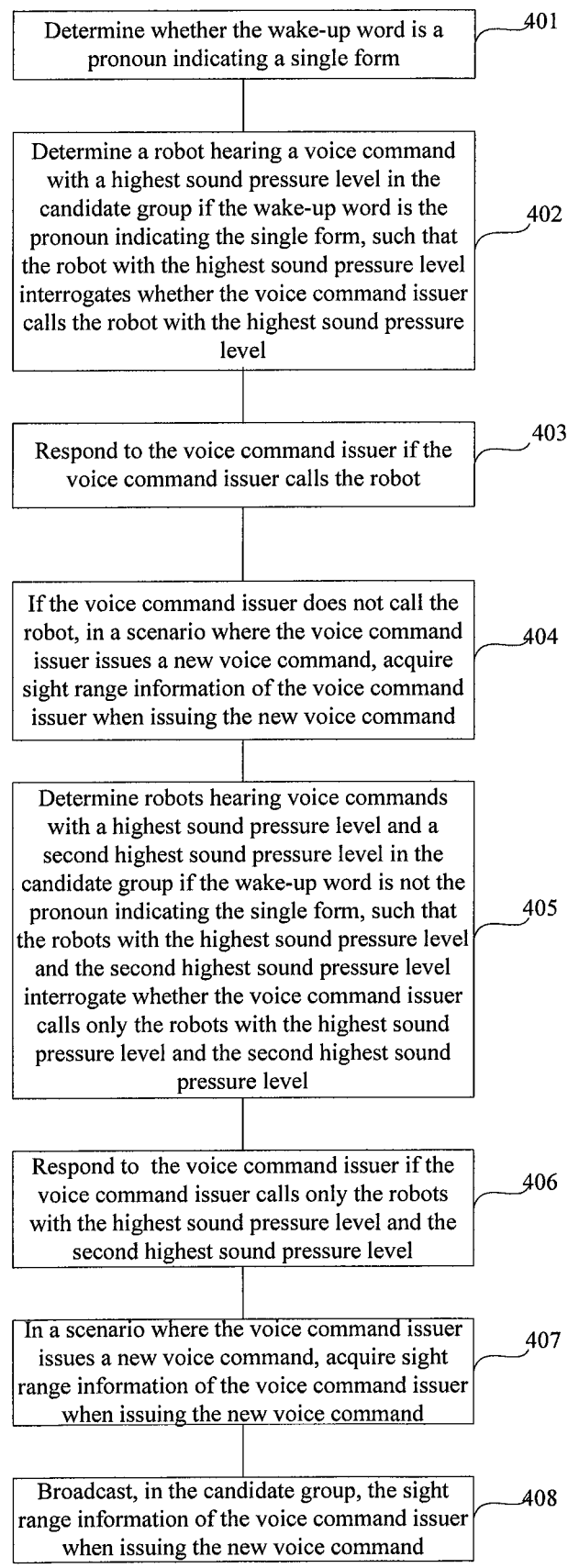
FIG. 6 is a flowchart of a step of interrogating the voice command issuer in the method for waking up a robot according to an embodiment of the present application.
Figure 11:
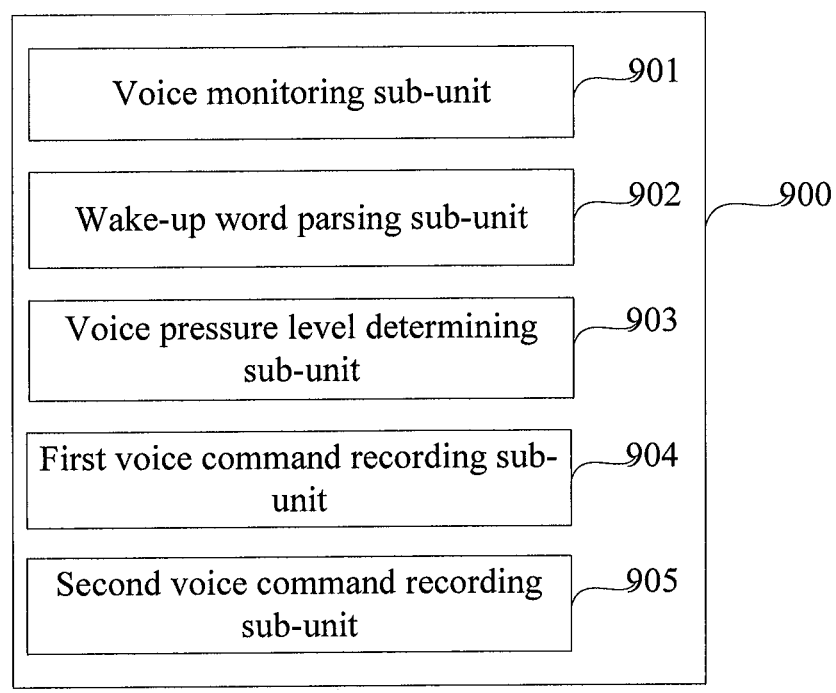
FIG. 11 is a schematic structural diagram of a voice command acquiring sub-module in the apparatus for waking up a robot according to an embodiment of the present application.
Figure 12:
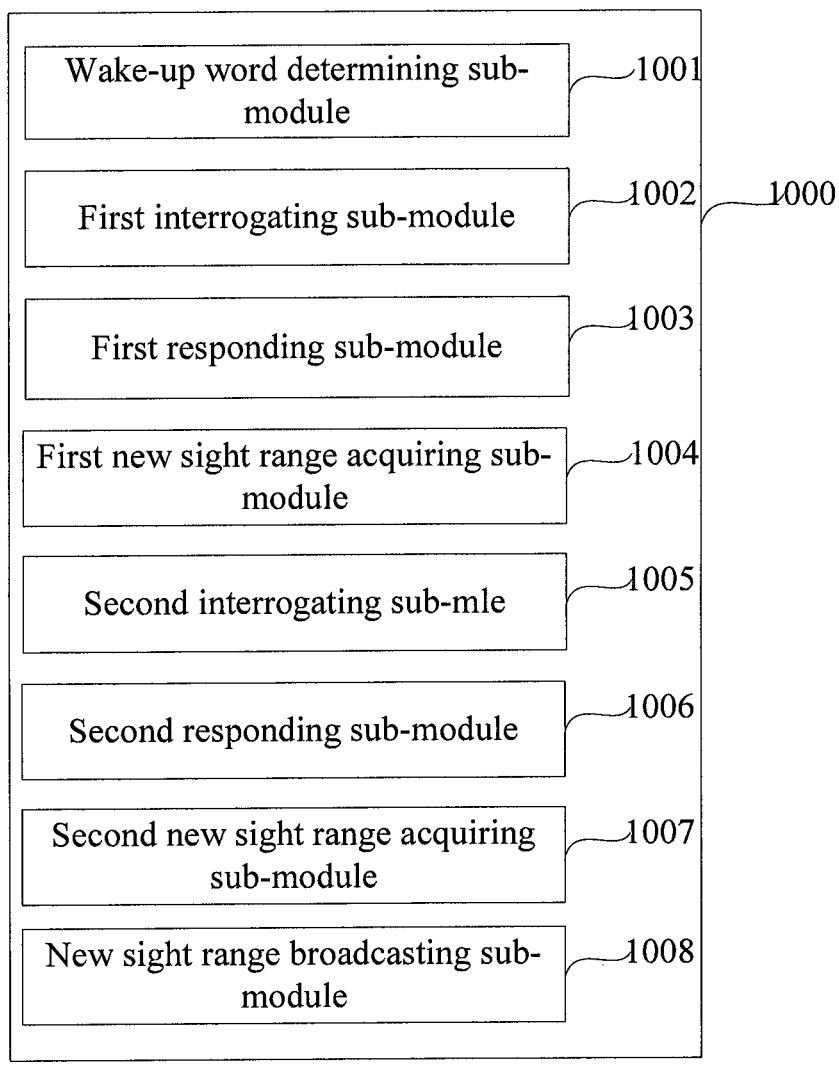
FIG. 12 is a schematic structural diagram of an interrogating module in the apparatus for waking up a robot according to an embodiment of the present application.
Figure 13:
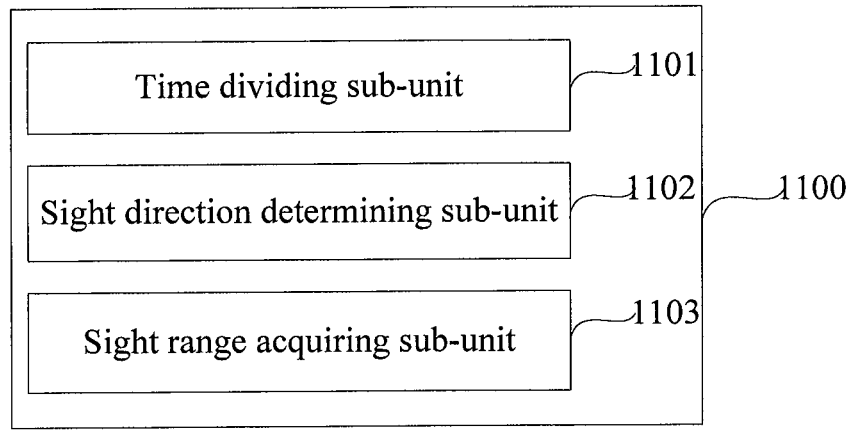
FIG. 13 is a schematic structural diagram of a sight range acquiring sub-module in the apparatus for waking up a robot according to an embodiment of the present application.
Figure 14:
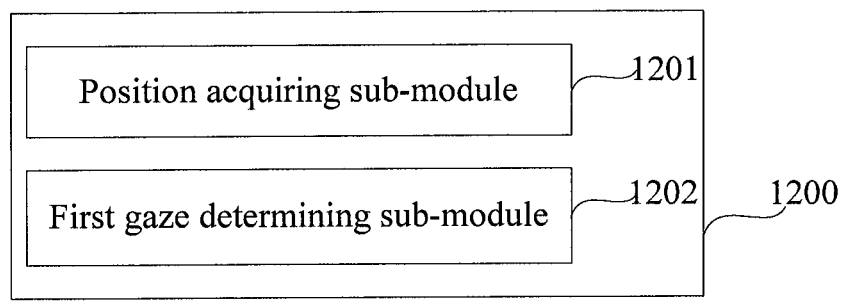
FIG. 14 is a schematic structural diagram of a call determining module in the apparatus for waking up a robot according to an embodiment of the present application.

One or more modules are stored in the memory 22, and when being executed by the at least one processor 21, perform the method for waking up a robot according to any of the above method embodiments, for example, performing steps 101 to 102 in the method as illustrated in FIG. 3, steps 201 to 203 in the method as illustrated in FIG. 4, steps 301 to 305 in the method as illustrated in FIG. 5, steps 401 to 408 in the method as illustrated in FIG. 6, and steps 501 to 515 in the method as illustrated in FIG. 7; and implementing the functions of the modules 601 and 602 as illustrated in FIG. 8, the sub-modules 701, 702 and 703 as illustrated in FIG. 9, the modules 801 to 803 and sub-modules 8011 to 8015 as illustrated in FIG. 10, the sub-units 901 to 905 as illustrated in FIG. 11, the sub-modules 1001 to 1008 as illustrated in FIG. 12, the sub-units 1101 to 1103 as illustrated in FIG. 13, and the sub-modules 1201 to 1202 as illustrated in FIG. 14.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application provides a non-volatile computer-readable storage medium. The computer readable storage medium stores computer-executable instructions, which, when being executed by at least one processor, for example, the at least one processor 21 as illustrated in FIG. 15, cause the at least one processor to perform the method for waking up a robot according to any of the above method embodiments, for example, performing steps 101 to 102 in the method as illustrated in FIG. 3, steps 201 to 203 in the method as illustrated in FIG. 4, steps 301 to 305 in the method as illustrated in FIG. 5, steps 401 to 408 in the method as illustrated in FIG. 6, and steps 501 to 515 in the method as illustrated in FIG. 7; and implementing the functions of the modules 601 and 602 as illustrated in FIG. 8, the sub-modules 701, 702 and 703 as illustrated in FIG. 9, the modules 801 to 803 and sub-modules 8011 to 8015 as illustrated in FIG. 10, the sub-units 901 to 905 as illustrated in FIG. 11, the sub-modules 1001 to 1008 as illustrated in FIG. 12, the sub-units 1101 to 1103 as illustrated in FIG. 13, and the sub-modules 1201 to 1202 as illustrated in FIG. 14.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A method for waking up a robot, applied to a robot, wherein the method comprises:
    acquiring sight range information when a voice command issuer issues a voice command;
    if the sight range information of the voice command issuer when issuing the voice command is acquired, determining, based on the sight range information, whether the voice command issuer gazes the robot when the voice command is issued; and
    determining that the robot is called if the voice command issuer gazes the robot;
    interrogating the voice command issuer if the sight range information of the voice command issuer when issuing the voice command is not acquired;
    wherein the acquiring sight range information when a voice command issuer issues a voice command comprises:
    acquiring voice command information, the voice command information comprising time information of the voice command and information of the voice command issuer;
    broadcasting the voice command information;
    determining whether a robot that hears the same voice command exists;
    enabling the robot that hears the same voice command to join a same candidate group if the robot that hears the same voice command exists;
    acquiring visual information and position information of the robot complying with the time information;
    acquiring, based on the visual information and the position information of the robot, the sight range information of the voice command issuer when issuing the voice command; and
    if the sight range information of the voice command issuer when issuing the voice command exists, broadcasting, in the candidate group, the sight range information of the voice command issuer when issuing the voice command.

2. The method according to claim 1, wherein the voice command information further comprises a sound pressure level of the voice command, and the acquiring voice command information comprises:
    monitoring a voice signal;
    parsing out a wake-up word in the voice signal;
    determining a sound pressure level of the voice signal;
    if the wake-up word indicates a call and the sound pressure level of the voice signal exceeds a predetermined threshold, recording a start time point and an end time point of the voice signal as the time information of the voice command, and recording the sound pressure level of the voice signal as the sound pressure level of the voice command;

identifying a voice signal issuer based on the voice signal; and
recording the voice signal issuer as the information of the voice command issuer.

3. The method according to claim 2, wherein the wake-up word is a pronoun indicating the call; and
the interrogating the voice command issuer comprises:
determining whether the wake-up word is a pronoun indicating a single form;
determining a robot with a highest sound pressure level in the candidate group if the wake-up word is the pronoun indicating the single form, such that the robot with the highest sound pressure level interrogates whether the voice command issuer calls the robot with the highest sound pressure level;
responding to the voice command issuer if the voice command issuer calls the robot with the highest sound pressure level;
otherwise, in a scenario where the voice command issuer issues a new voice command, acquiring sight range information of the voice command issuer when issuing the new voice command;
determining robots with a highest sound pressure level and a second highest sound pressure level in the candidate group if the wake-up word is not the pronoun indicating the single form, such that the robots with the highest sound pressure level and the second highest sound pressure level interrogate whether the voice command issuer calls only the robots with the highest sound pressure level and the second highest sound pressure level;
responding to the voice command issuer if the voice command issuer calls only the robots with the highest sound pressure level and the second highest sound pressure level;
otherwise, in a scenario where the voice command issuer issues a new voice command, acquiring sight range information of the voice command issuer when issuing the new voice command;
broadcasting, in the candidate group, the sight range information of the voice command issuer when issuing the new voice command; and
the method further comprises:
if the sight range information of the voice command issuer when issuing the new voice command is acquired, determining, based on the sight range information, whether the voice command issuer gazes the robot when the voice command is issued; and
determining that the robot is called if the voice command issuer gazes the robot; and
responding to the voice command issuer.

4. The method according to claim 1, wherein the voice command information further comprises a sound pressure level of the voice command, and the acquiring voice command information comprises:
monitoring a voice signal;
parsing out a wake-up word in the voice signal;
determining a sound pressure level of the voice signal;
if the wake-up word indicates a call and the sound pressure level of the voice signal exceeds a predetermined threshold, recording a start time point and an end time point of the wake-up word as the time information of the voice command, and recording the sound pressure level of the voice signal as the sound pressure level of the voice command; and identifying a voice signal issuer based on the voice signal, and recording the voice signal issuer as the information of the voice command issuer.

5. The method according to claim 1, wherein the acquiring, based on the visual information and the position information of the robot, the sight range information of the voice command issuer when issuing the voice command comprises:
equally dividing the time information of the voice command into a plurality of time points;
at each time point, determining an angle between the face of the voice command issuer and the robot based on the visual information at the time point;
acquiring a sight direction at the time point based on the position information of the robot at the time point and the angle; and
using the acquired sight direction and a time point corresponding to the sight direction as the sight range information.

6. The method according to claim 5, wherein the determining, based on the sight range information, whether the voice command issuer gazes the robot when the voice command is issued comprises:
acquiring the position information of the robot within a predetermined time period;
determining whether the position information complying with the sight direction of the robot at a time point of the sight range information exists; and
determining that the voice command issuer gazes the robot if the position information of the robot complying with the sight direction at a time point of the sight range information exists.

7. The method according to claim 1, wherein the acquiring, based on the visual information and the position information of the robot, the sight range information of the voice command issuer when issuing the voice command comprises:
equally dividing the time information of the voice command into a plurality of time points;
at each time point, determining an angle between the face of the voice command issuer and the robot based on the visual information at the time point;
acquiring a sight direction at the time point based on the position information of the robot issuer at the time point and the angle;
acquiring a sight interval and a time range corresponding to the sight interval based on the acquired sight direction and the time point corresponding to the sight direction; and
using the sight interval and the time range as the sight range information.

8. The method according to claim 7, wherein the determining, based on the sight range information, whether the voice command issuer gazes the robot when the voice command is issued comprises:
acquiring the position information of the robot within a predetermined time period;
determining whether the position information of the robot at the time range of the sight range information complies with the sight interval; and
determining that the voice command issuer gazes the robot if the position information of the robot at the time range of the sight range information complies with the sight interval.

9. A robot, comprising:
at least one processor; and a memory communicably connected to the at least one processor; wherein the memory stores instructions executable by the at least one processor, wherein, the instructions, when being executed by the at least one processor, cause the at least one processor to perform the steps of:

acquiring sight range information when a voice command issuer issues a voice command;

if the sight range information of the voice command issuer when issuing the voice command is acquired, determining, based on the sight range information, whether the voice command issuer gazes the robot when the voice command is issued; and determining that the robot is called if the voice command issuer gazes the robot;

interrogating the voice command issuer if the sight range information of the voice command issuer when issuing the voice command is not acquired;

wherein the acquiring sight range information when a voice command issuer issues a voice command comprises:

acquiring voice command information, the voice command information comprising time information of the voice command and information of the voice command issuer;

broadcasting the voice command information;

determining whether a robot that hears the same voice command exists;

enabling the robot that hears the same voice command to join a same candidate group if the robot that hears the same voice command exists;

acquiring visual information and position information of the robot complying with the time information;

acquiring, based on the visual information and the position information of the robot, the sight range information of the voice command issuer when issuing the voice command; and if the sight range information of the voice command issuer when issuing the voice command exists, broadcasting, in the candidate group, the sight range information of the voice command issuer when issuing the voice command.

10. The robot according to claim 9, wherein the voice command information further comprises a sound pressure level of the voice command, and the acquiring voice command information comprises:

monitoring a voice signal;

parsing out a wake-up word in the voice signal;

determining a sound pressure level of the voice signal;

if the wake-up word indicates a call and the sound pressure level of the voice signal exceeds a predetermined threshold, recording a start time point and an end time point of the voice signal as the time information of the voice command, and recording the sound pressure level of the voice signal as the sound pressure level of the voice command;

identifying a voice signal issuer based on the voice signal; and recording the voice signal issuer as the information of the voice command issuer.

11. The robot according to claim 10, wherein the wake-up word is a pronoun indicating the call; and the interrogating the voice command issuer comprises:

determining whether the wake-up word is a pronoun indicating a single form;

determining a robot with a highest sound pressure level in the candidate group if the wake-up word is the pronoun indicating the single form, such that the robot with the highest sound pressure level interrogates whether the voice command issuer calls the robot with the highest sound pressure level;

responding to the voice command issuer if the voice command issuer calls the robot with the highest sound pressure level;

otherwise, in a scenario where the voice command issuer issues a new voice command, acquiring sight range information of the voice command issuer when issuing the new voice command;

determining robots with a highest sound pressure level and a second highest sound pressure level in the candidate group if the wake-up word is not the pronoun indicating the single form, such that the robots with the highest sound pressure level and the second highest sound pressure level interrogate whether the voice command issuer calls only the robots with the highest sound pressure level and the second highest sound pressure level;

responding to the voice command issuer if the voice command issuer calls only the robots with the highest sound pressure level and the second highest sound pressure level;

otherwise, in a scenario where the voice command issuer issues a new voice command, acquiring sight range information of the voice command issuer when issuing the new voice command;

broadcasting, in the candidate group, the sight range information of the voice command issuer when issuing the new voice command; and wherein the instructions, when being executed by the at least one processor, cause the at least one processor further to perform the steps of:

if the sight range information of the voice command issuer when issuing the new voice command is acquired, determining, based on the sight range information, whether the voice command issuer gazes the robot when the voice command is issued; and determining that the robot is called if the voice command issuer gazes the robot; and responding to the voice command issuer.

12. The robot according to claim 9, wherein the voice command information further comprises a sound pressure level of the voice command, and the acquiring voice command information comprises:

monitoring a voice signal;

parsing out a wake-up word in the voice signal;

determining a sound pressure level of the voice signal;

if the wake-up word indicates a call and the sound pressure level of the voice signal exceeds a predetermined threshold, recording a start time point and an end time point of the wake-up word as the time information of the voice command, and recording the sound pressure level of the voice signal as the sound pressure level of the voice command; and identifying a voice signal issuer based on the voice signal, and recording the voice signal issuer as the information of the voice command issuer.

13. The robot according to claim 9, wherein the acquiring, based on the visual information and the position information of the robot, the sight range information of the voice command issuer when issuing the voice command comprises:

equally dividing the time information of the voice command into a plurality of time points;

at each time point, determining an angle between the face of the voice command issuer and the robot based on the visual information at the time point;

acquiring a sight direction at the time point based on the position information of the robot at the time point and the angle; and using the acquired sight direction and a time point corresponding to the sight direction as the sight range information.

14. The robot according to claim 13, wherein the determining, based on the sight range information, whether the voice command issuer gazes the robot when the voice command is issued comprises:

acquiring the position information of the robot within a predetermined time period;

determining whether the position information complying with the sight direction of the robot at a time point of the sight range information exists; and determining that the voice command issuer gazes the robot if the position information of the robot complying with the sight direction at a time point of the sight range information exists.

15. The robot according to claim 9, wherein the acquiring, based on the visual information and the position information of the robot, the sight range information of the voice command issuer when issuing the voice command comprises:

equally dividing the time information of the voice command into a plurality of time points;

at each time point, determining an angle between the face of the voice command issuer and the robot based on the visual information at the time point;

acquiring a sight direction at the time point based on the position information of the robot issuer at the time point and the angle;

acquiring a sight interval and a time range corresponding to the sight interval based on the acquired sight direction and the time point corresponding to the sight direction; and using the sight interval and the time range as the sight range information.

16. A non-transitory computer-readable storage medium, wherein the computer-readable storage medium stores computer-executable instructions, which, when being executed by a robot, cause the robot to perform the steps of:

acquiring sight range information when a voice command issuer issues a voice command;

if the sight range information of the voice command issuer when issuing the voice command is acquired, determining, based on the sight range information, whether the voice command issuer gazes the robot when the voice command is issued; and determining that the robot is called if the voice command issuer gazes the robot;

interrogating the voice command issuer if the sight range information of the voice command issuer when issuing the voice command is not acquired;

wherein the acquiring sight range information when a voice command issuer issues a voice command comprises:

acquiring voice command information, the voice command information comprising time information of the voice command and information of the voice command issuer;

broadcasting the voice command information;

determining whether a robot that hears the same voice command exists;

enabling the robot that hears the same voice command to join a same candidate group if the robot that hears the same voice command exists;

acquiring visual information and position information of the robot complying with the time information;

acquiring, based on the visual information and the position information of the robot, the sight range information of the voice command issuer when issuing the voice command; and if the sight range information of the voice command issuer when issuing the voice command exists, broadcasting, in the candidate group, the sight range information of the voice command issuer when issuing the voice command.

* * * * *